United States Patent
Tali et al.

(10) Patent No.: US 9,801,058 B2
(45) Date of Patent: Oct. 24, 2017

(54) METHOD AND SYSTEM FOR AUTHENTICATING AN INDIVIDUAL'S GEO-LOCATION VIA A COMMUNICATION NETWORK AND APPLICATIONS USING THE SAME

(71) Applicants: Tarik Tali, Lakeway, TX (US); Hassan Zili, Tangier (MA); Abdelhak Tali, Tangier (MA)

(72) Inventors: Tarik Tali, Lakeway, TX (US); Hassan Zili, Tangier (MA); Abdelhak Tali, Tangier (MA)

( * ) Notice: Subject to any disclaimer, the term of this patent is extended or adjusted under 35 U.S.C. 154(b) by 145 days.

(21) Appl. No.: 14/699,460

(22) Filed: Apr. 29, 2015

(65) Prior Publication Data

US 2016/0021535 A1 Jan. 21, 2016

Related U.S. Application Data

(60) Provisional application No. 61/985,693, filed on Apr. 29, 2014.

(51) Int. Cl.
H04W 12/06 (2009.01)
H04L 29/06 (2006.01)
(Continued)

(52) U.S. Cl.
CPC .......... *H04W 12/06* (2013.01); *H04W 4/008* (2013.01); *H04W 4/021* (2013.01); *H04W 4/028* (2013.01);
(Continued)

(58) Field of Classification Search
CPC ...... H04W 12/06; H04W 4/008; H04W 64/00
(Continued)

(56) References Cited

U.S. PATENT DOCUMENTS

2002/0087264 A1* 7/2002 Hills ................... G01C 22/006
701/467
2008/0139114 A1* 6/2008 Ranganathan ......... H04B 17/27
455/41.1

(Continued)

OTHER PUBLICATIONS

Master's Thesis of Lugovaya T.S. "Biometric human identification based on electrocardiogram." Faculty of Computing Technologies and Informatics, Electrotechnical University, Saint-Petersburg, Russian Federation, Jun. 2005.

(Continued)

*Primary Examiner* — Kashif Siddiqui
(74) *Attorney, Agent, or Firm* — Blynn L. Shideler; Krisanne Shideler; BLK Law Group

(57) ABSTRACT

A method and associated system for authenticating an individual's geo-location via a communication network is disclosed. The method comprises the steps of: a) Providing an individual with a smartphone having a GPS receiving unit associated with a communications network; b) Providing the individual with a biometric user identification technology; c) Obtaining via the communications network the geo-location of the smartphone utilizing the GPS receiving unit; d) Identifying the user with the biometric user identification technology by obtaining biometric characteristics that are unique to each human; and e) Verifying the biometric user identification technology is within a preset proximity to the smartphone to authenticate the individual's geo-location.

18 Claims, 10 Drawing Sheets

(51) Int. Cl.
*H04W 4/00* (2009.01)
*H04W 4/02* (2009.01)
*H04W 68/00* (2009.01)
*H04W 12/10* (2009.01)

(52) U.S. Cl.
CPC ......... *H04W 68/00* (2013.01); *H04L 63/0861* (2013.01); *H04W 12/10* (2013.01)

(58) Field of Classification Search
USPC .............................. 455/410, 411, 456.1–457
See application file for complete search history.

(56) References Cited

U.S. PATENT DOCUMENTS

| | | | | |
|---|---|---|---|---|
| 2008/0200774 | A1* | 8/2008 | Luo | A61B 5/0002 600/301 |
| 2009/0270743 | A1* | 10/2009 | Dugan | A61B 5/0002 600/500 |
| 2010/0217099 | A1* | 8/2010 | LeBoeuf | A61B 5/00 600/301 |
| 2013/0030955 | A1* | 1/2013 | David | G06Q 10/08 705/26.8 |
| 2013/0133049 | A1* | 5/2013 | Peirce | G06F 21/32 726/6 |
| 2013/0251216 | A1* | 9/2013 | Smowton | H04L 9/3231 382/118 |
| 2014/0123325 | A1* | 5/2014 | Jung | G06F 21/6254 726/30 |
| 2014/0180566 | A1* | 6/2014 | Malhotra | G08G 3/02 701/300 |
| 2014/0289820 | A1* | 9/2014 | Lindemann | G06Q 20/42 726/5 |
| 2015/0035643 | A1* | 2/2015 | Kursun | G07C 9/00158 340/5.52 |
| 2015/0065055 | A1* | 3/2015 | Newham | H04W 4/008 455/41.3 |
| 2015/0081349 | A1* | 3/2015 | Johndrow | G06Q 20/3224 705/5 |
| 2015/0305591 | A1* | 10/2015 | Wolfe | A47L 15/4244 134/18 |
| 2016/0360354 | A1* | 12/2016 | Rhee | H04W 4/02 |

OTHER PUBLICATIONS

Y. Gahi, et al. "Biometric Identification System Based on Electrocardiogram Data" by University of Ontario Institute of Technology, 2000 Simcoe Street North, Oshawa, Ontario, Canada. L1H 7K4, 2008.

Abstract of: Odinaka, I and Preston M. Green in "ECG Biometric Recognition: A Comparative Analysis" Information Forensics and Security, IEEE Transactions on (vol. 7, Issue: 6) Biometrics Compendium, IEEE , pp. 1812-1824, 2012.

André Lourenço, Hugo Silva, and Ana Fred "Unveiling the Biometric Potential of Finger-Based ECG Signals" by, Computational Intelligence and Neuroscience vol. 2011 (2011), Article ID 720971.

* cited by examiner

METHOD AND SYSTEM FOR AUTHENTICATING AN INDIVIDUAL'S GEO-LOCATION VIA A COMMUNICATION NETWORK AND APPLICATIONS USING THE SAME

RELATED APPLICATIONS

This application claims priority to U.S. Patent Application Ser. No. 61/985,693 filed Apr. 29, 2014, entitled "Method and System for Accessing, Acquiring, Storing and Managing each Individual's Geo-Location Position Data via a Communication Network Providing an Internet of Things Geo-Location Software Management Utility" which application is incorporated herein by reference in its entirety.

BACKGROUND INFORMATION

1. Field of the Invention

The present invention relates to geo-locations software management utility. Specifically the present invention provides a method and system for authenticating an individual's geo-location via a communication network and applications using the same.

2. Background Information

The term smartphone (or smartphone) is a mobile phone with an advanced mobile operating system which typically combines the features of a cell phone with those of other popular mobile devices, such as personal digital assistant (PDA), media players and GPS navigation units. Most smartphones have a touch screen user interface and can run third-party applications (apps), and are camera phones and audio recorders. Generally since at least 2012, smartphones have high-speed mobile broadband 4G LTE internet web browsing, motion sensors, and mobile payment mechanisms. In 2014, sales of smartphones worldwide topped 1.2 billion, which is almost a 30% increase from sales of 2013.

GPS, or global positioning satellite, is a satellite-based navigation system used to give exact location and time information anywhere on Earth. The system is maintained by the U.S. government and is accessible, free of charge, to anyone with a GPS receiver. Consumers have become increasingly reliant on GPS receivers for navigation while driving, as well as while biking and walking.

Originally, standalone GPS units, also known as personal navigation devices, were the only option available to consumers who wanted to take advantage of GPS technology. However, now that almost every current smartphone comes with a built-in GPS receiver, smartphones have largely replaced standalone units as consumers generally have found it is more convenient to just use their phones as navigation tools rather than bother with a separate stand-alone GPS unit. The smartphone GPS navigation apps are a subset of what can be considered broader geo-locations data management systems.

Smartphone GPS navigation apps gets frequent, automatic updates, meaning all the latest maps will always be on-hand and having the most current updates is invaluable when searching for points of interest along an unknown route, or when trying to re-route around heavy traffic. Using a smartphone as a GPS receiver taps into the idea of a smartphone as an all-in-one device. Many smartphone users always have their phones with them such that they will always have a GPS navigation tool on-hand. Smartphones are designed to be easily held in one hand, and thus are often the preferred choice for navigation while walking or biking. Smartphone GPS navigation apps not only have the ability to provide real-time traffic detection and avoidance, but can provide other services such as check gas prices. Additionally, the ability to call a business or tourist attraction to check hours and rates with a simple tap is one more advantage of using smartphone GPS navigation apps.

Smartphone GPS navigation apps allow for easy address entry. Smartphones allow users to look up a contact in their phone's address book and then navigate to that address without any additional typing. Also, addresses found via a smartphone Internet search or through another application can be sent directly to the GPS navigation app.

Current geo-locations data management systems such as the smartphone GPS based navigation apps are based on pinpointing the location of each individual's smartphone using the global positioning system (GPS) however, the geo-location position captured at any particular time does not confirm that the individual user (often owner) of the smartphone is, was also present at the time the geo-location position of their smartphone was captured. Furthermore, the data captured of the individual's location does not guarantee that this individual is the sole and unique owner of the smartphone used. It is one object of the present invention to address these deficiencies of the existing prior art.

SUMMARY OF THE INVENTION

This invention is directed to a cost effective, efficient, method and system for authenticating, accessing, acquiring, storing and managing each individual's geo-location position data via a communication networks.

One embodiment of the present invention provides a method for authenticating an individual's geo-location via a communication network comprising the steps of: a) providing an individual with a smartphone having a GPS receiving unit associated with a communications network; b) providing the individual with a biometric user identification technology; c) obtaining via the communications network the geo-location of the smartphone utilizing the GPS receiving unit; d) identifying the user with the biometric user identification technology by obtaining biometric characteristics that are unique to each human; and e) verifying the biometric user identification technology is within a preset proximity to the smartphone to authenticate the individual's geo-location One embodiment of the present invention provides a system for authenticating an individual's geo-location via a communication network comprising a) a smartphone having a GPS receiving unit associated with a communications network, wherein the system is configured to obtain via the communications network the geo-location of the smartphone utilizing the GPS receiving unit; and b) a biometric user identification technology worn by the individual configured to obtain biometric characteristics that are unique to each human, wherein the system is configured to identify the individual with the biometric user identification technology and to verify the biometric user identification technology is within a preset proximity to the smartphone to authenticate the individual's geo-location.

The method and associated system for authenticating an individual's geo-location via a communication network of one aspect of the invention provides wherein the biometric user identification technology utilizes the individual's electrocardiogram as a biometric characteristic that is unique to each human. The biometric user identification technology may effectively utilize a wristband worn by the individual for passive biometric user identification and wherein the wristband is wirelessly coupled to the smartphone. The biometric user identification technology thus may effectively utilize a wristband obtaining the individual's electrocardiogram with the wristband communicating with the smartphone.

The method for authenticating an individual's geo-location via a communication network of one aspect of the invention may further include recording the individual's authenticated geo-locations for at least a period of time, wherein during recording of the individual's authenticated geo-locations, the method may include recording any periods when the individual's geo-location cannot be authenticated. Periods when the individual's geo-location cannot be authenticated include when the biometric characteristics obtained by the biometric user identification technology fail to identify the user and when the biometric user identification technology is not within a preset proximity to the smartphone.

The method for authenticating an individual's geo-location via a communication network of one aspect of the invention provides wherein method includes incorporating user defined restricted areas for the individual. The restricted areas could be areas in which the individual must remain and operate (e.g., authorized work zones, house arrest limitations, school boundaries), or it could be areas that the individual is prevented from entering (e.g., restricted/high security areas, restraining order limitations) or both. The method may include the step of sending a warning message to the individual when the individual is approaching a boundary of the user defined restricted area. It is worthwhile to note that "approaching a boundary" is broadly defined in this application as it is intended to encompass both coming close to a restricted area or leaving a defined work area. Further it should be understood that the user defined areas may vary by time and/or by individual.

The method for authenticating an individual's geo-location via a communication network of one aspect of the invention may provide wherein a single user is authenticating multiple individual's geo-locations.

The method for authenticating an individual's geo-location via a communication network of one aspect of the invention may further include integrating the authenticated individual's geo-location with location based social networks data (e.g., FACEBOOK®, FOURSQUARE®, etc) as proof-of-presence of the individual in the location based social network data.

The method for authenticating an individual's geo-location via a communication network of one aspect of the invention may further include cross-checking the authenticated individual's geo-location with location based check-in data from location based platforms to further validate as proof-of-presence the geo-location data of the individual's presence at a certain location. The method may further include identifying any anomalous results between the authenticated individual's geo-location and the location based check-in data from location based platforms.

The method for authenticating an individual's geo-location via a communication network of one aspect of the present invention may further include marking recordings, such as pictures, videos or audio recordings, taken with the individual smartphone with the geo-location where the image was taken, the time the was taken, and the authenticated geo-location data of the individual when and where the image was taken. The method will allow for authentication of any image, video, audio recording and/or sensor reading recorded by the smartphone to verify the location and individual making the record via the smartphone.

The method for authenticating an individual's geo-location via a communication network of one aspect of the invention further includes limiting access to at least some of the smartphone applications, e.g. banking applications, to the individual as verified by the biometric user identification technology. The method may further provide wherein the step of limiting access to at least some of the smartphone applications to the individual as verified by the biometric user identification technology includes limited access to at least some of the smartphone applications when the individual and the smartphone are within pre-defined geo-locations. For example, a bank ATM may utilize and interact with the smartphone of the individual to quickly and safely access a proper individual's account and the bank ATM may further verify the identity of the individual both with the biometric technology and by the presence of the phone and individual at the designated ATM geo-location, thereby passively providing a high level of security.

The method for authenticating an individual's geo-location via a communication network of the present invention provides wherein the individual owner of the smartphone interacts with Internet-Of-Things devices.

The system and method may be described as relating to a comprehensive geo-location software management utility and includes a wristband equipped with a digital ECG wireless transmitter, a secured user-to-smartphone unique cardiac rhythms identification access system, a cellular network, a storage network, a database and online software as a service application. The present invention system and method secures that the both the individual, e,g, the owner of the smartphone, and the associated smartphone were both present at same geo-location position of the smartphone through global positioning system (GPS) when the data was captured and logged-in in to the database by the geo-location software management utility. Furthermore, the present system and method secures that the smartphone used when the data was captured indeed belongs to the individual at the time the geo-location position GPS of the smartphone was captured and logged-in.

These and other aspects of the present invention will be clarified in the description of the preferred embodiment of the present invention described below in connection with the attached figures in which like reference numerals represent like elements throughout.

BRIEF DESCRIPTION OF THE PREFERRED EMBODIMENTS

Figure 1:
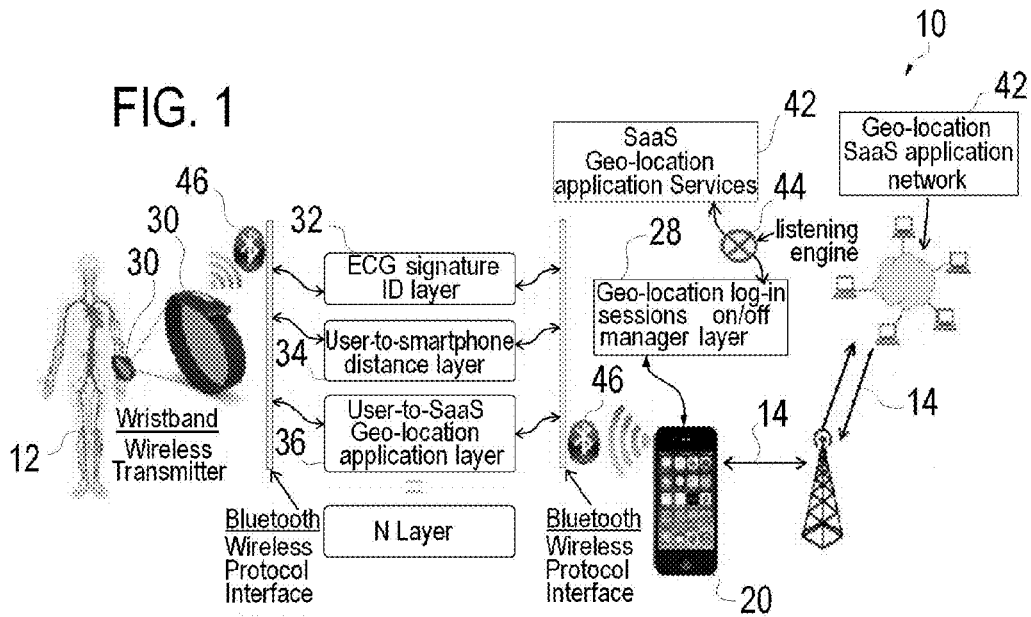
FIG. 1 is a schematic diagram of a system for authenticating an individual's geo-location via a communication network in accordance with one aspect of the present invention.
Figure 2:
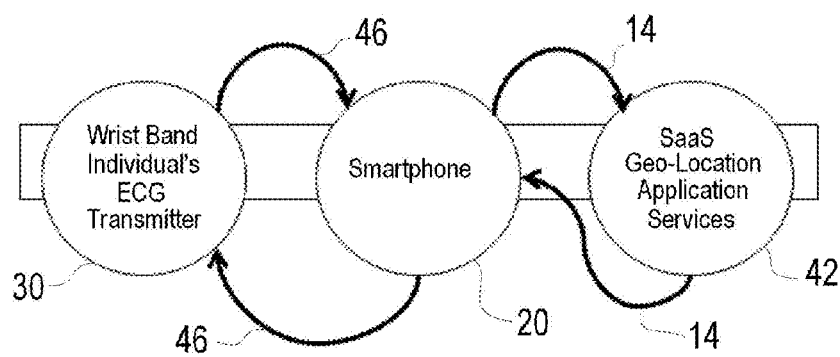
FIG. 2 is a schematic diagram of an individual to smartphone distance management layer of the system of FIG. 1.
Figure 3:
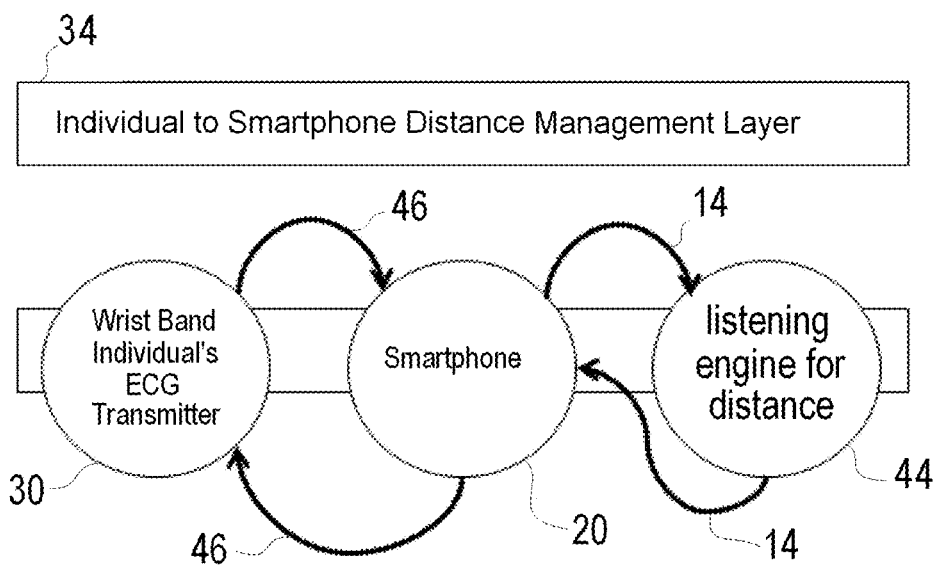
FIG. 3 is a schematic diagram of a ECG signal ID management layer of the system of FIG. 1.
Figure 4:
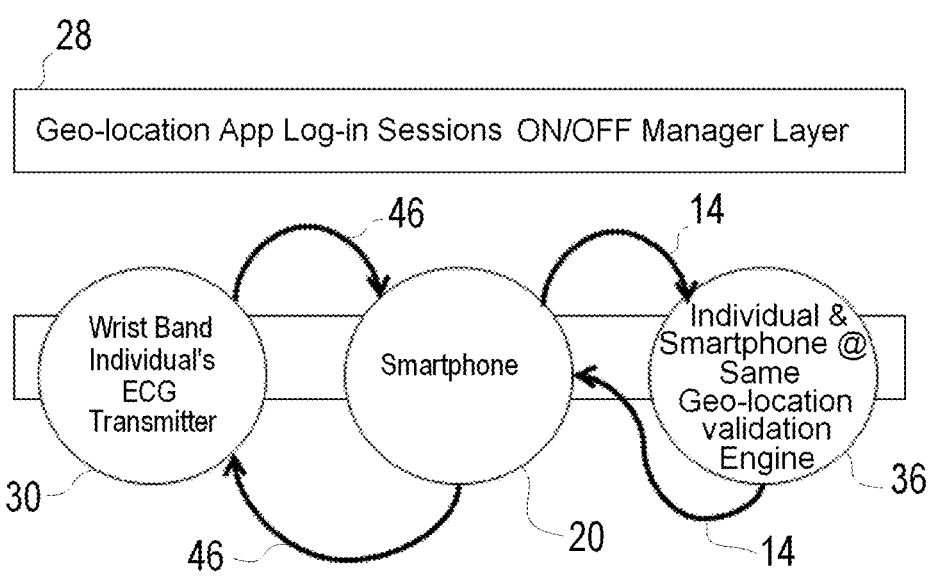
FIG. 4 is a schematic diagram of a geo-location application login session management layer of the system of FIG. 1.
Figure 5:
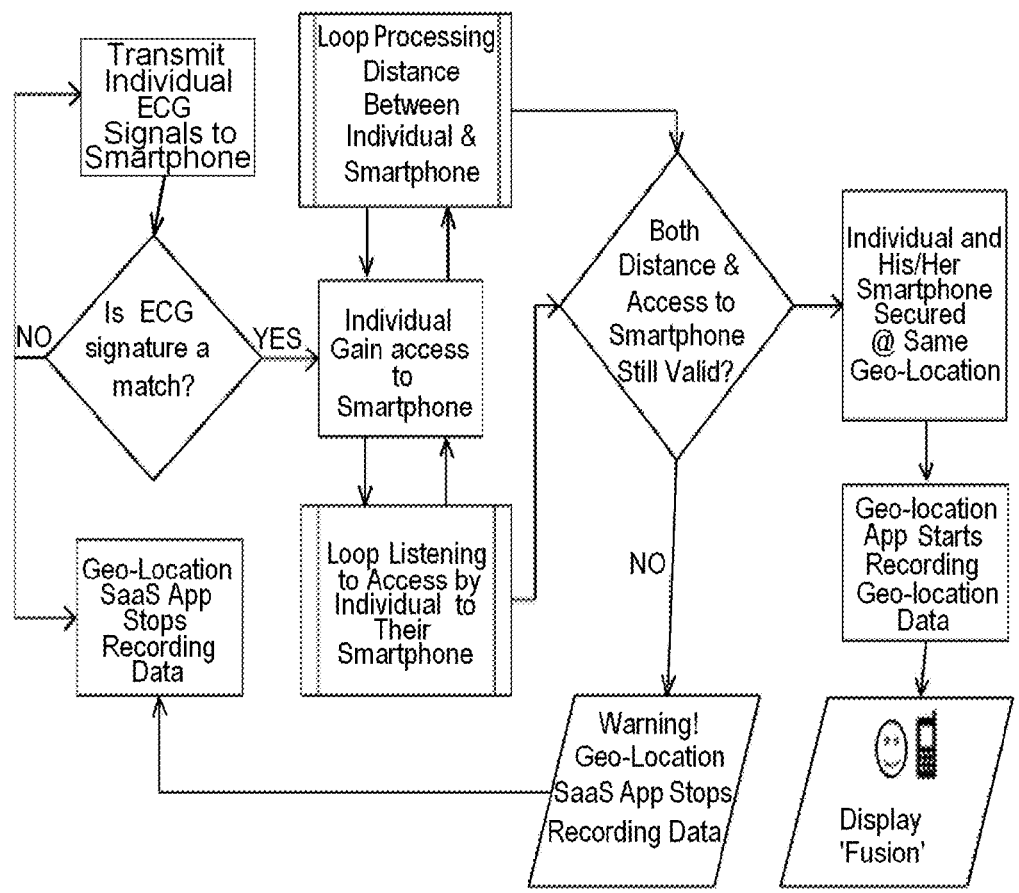
FIG. 5 is a schematic diagram of a process for verifying the same location of the individual and their smartphone of the system of FIG. 1.
Figure 6:
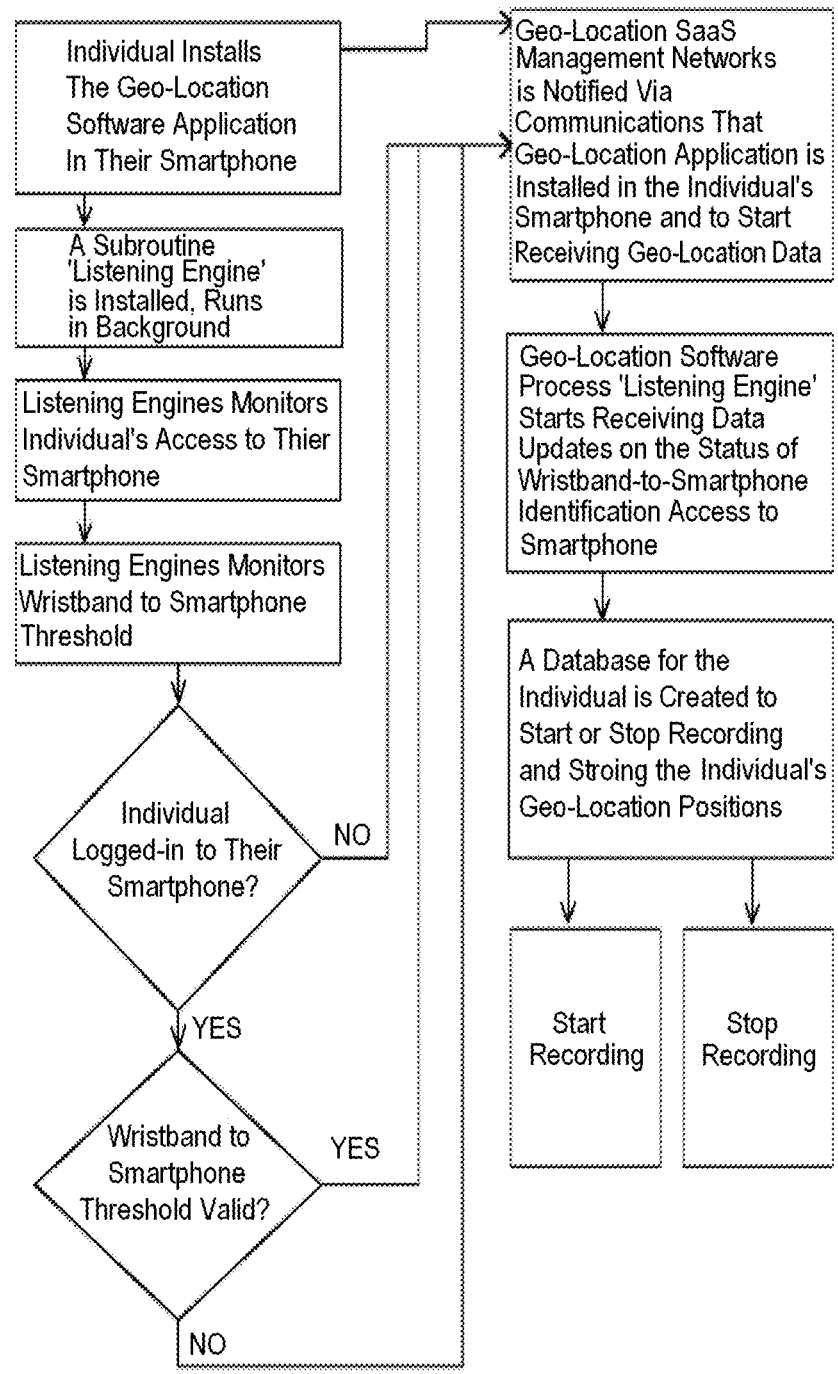
FIG. 6 is a schematic diagram of a process for communication between an individual's smartphone geo-location utility and geo-location Saa networks of the system of FIG. 1.

This invention is directed to a cost effective, efficient, system 10 for authenticating accessing, acquiring, storing and managing the geo-location position data of each individual 12 via a communication network 14 associated with the individual's smartphone 20, which includes a GPS receiving unit. The system 10 uses a biometric user identification technology, and in one preferred embodiment a continuous and passive wristband based electrocardiogram 30.

There are many types of biometric user identification technologies, but there are several types that are most commonly used. Biometric user identification is basically the recognition of human characteristics that are unique to each human, which can include fingerprints, hand geometry, retinal scanning, iris scanning, facial recognition, vein pattern, voice recognition, DNA, electrocardiograms, and more.

FINGERPRINT TECHNOLOGY—Fingerprint identification techniques fall into two major categories—Automated Fingerprint Identification Systems (AFIS) and fingerprint recognition systems. AFIS is typically restricted to law-enforcement use. Fingerprint recognition derives a unique template from the attributes of the fingerprint without storing the image itself or even allowing for its reconstruction. Fingerprint recognition for identification acquires the initial image through live scan of the finger by direct contact with a reader device that can also check for validating attributes such as temperature and pulse. Since the finger actually touches the scanning device, the surface can become oily and cloudy after repeated use and reduce the sensitivity and reliability of optical scanners. Solid state sensors overcome this and other technical hurdles because the coated silicon chip itself is the sensor. Solid state devices use electrical capacitance to sense the ridges of the fingerprint and create a compact digital image, so they are less sensitive to dirt and oils. Fingerprint recognition is generally considered reliable and readers are in commercial use, and some vendors have actively marketed readers as part of Local Area Network login schemes.

HAND GEOMETRY—The essence of hand geometry is the comparative dimensions of fingers and the locations of joints. One of the earliest automated biometric systems, INDENTIMAT, installed at the Shearson-Hamill investment bank on Wall St. during the late 60s, used hand geometry and stayed in production for almost twenty years. Some systems perform simple, two-dimensional measurements of the palm of the hand. Others attempt to construct a simple three-dimensional image from which to extract template characteristics. In one of the most popular descendants of the IDENTIMAT system, a small digital camera captures top and side images of the hand. Reference marks on a platen allow calibration of the image to improve the precision of matching.

RETINAL SCAN—Retinal recognition creates an "eye signature" from the vascular configuration of the retina, an extremely consistent and reliable attribute with the advantage of being protected inside the eye itself. An image of the retina is captured by having the individual look through a lens at an alignment target. Diseases or injuries that would interfere with the retina are comparatively rare in the general population, so the attribute normally remains both consistent and consistently available.

IRIS SCANNING—Iris scanning is less intrusive than retinal recognition because the iris is easily visible from several feet away. Responses of the iris to changes in light can provide secondary verification that the iris presented as a biometric factor is genuine. A balance of light, focus, resolution, and contrast can be necessary (depending upon the scanner) to extract the attributes or minutiae from the localized image. It is noteworthy that while the iris seems to be consistent throughout adulthood, it does vary somewhat up to adolescence.

FACIAL RECOGNITION—Face recognition technology has made substantial advances in the last few years. Acquisition for biometric identification purposes generally requires the individual's face to be presented to a video camera. A facial thermogram works much like face recognition except that the image is captured by way of an infrared camera, and the heat signature of the face is used to create the biometric template used for matching.

VEIN PATTERN—Hand vein recognition attempts to distinguish individuals by measuring the differences in subcutaneous features of the hand using infrared imaging. Like face recognition, it must deal with the extra issues of three-dimensional space and the orientation of the hand. Like retinal scanning, it relies on the pattern of the veins in the hand to build a template with which to attempt matches against templates stored in a database. The use of infrared imaging offers some of the same advantages as hand geometry over fingerprint recognition in manufacturing or shop-floor applications where hands may not be clean enough to scan properly using a conventional video or capacitance technique.

VOICE RECOGNITION—Voice recognition techniques are generally categorized according to two approaches—Automatic Speaker Verification (ASV) and Automatic Speaker Identification (ASI). Speaker verification uses voice as the authenticating attribute in a two-factor scenario. Speaker identification attempts to use voice to identify who an individual actually is. Voice recognition distinguishes an individual by matching particular voice traits against templates stored in a database. Voice systems must be trained to the individual's voice at enrollment time, and more than one enrollment session is often necessary. Feature extraction typically measures formants or sound characteristics unique to each person's vocal tract. The pattern matching algorithms used in voice recognition are similar to those used in face recognition.

DNA—DNA is the gold standard of biometric user identification, but presently there is no efficient scanner to provide practical real time results.

ELECTROCARDIOGRAMS—Electrocardiograms (ECG also called EKG—from Greek with "kardia" meaning heart) are records of electrical currents generated by the beating heart, and have been found to be a distinctive identifying human characteristic, since ECG waveforms and other properties of the ECG depend on the anatomic features of the human heart and body. It has been suggested that the use ECG for biometric identification is supported by the fact that the physiological and geometrical differences of the heart in different individuals display certain identifiable uniqueness in their ECG signals. See "Biometric human identification based on electrocardiogram." [Master's thesis of Lugovaya T. S.] Faculty of Computing Technologies and Informatics, Electrotechnical University, Saint-Petersburg, Russian Federation, June 2005. See also Biometric human identification based on electrocardiogram. Nemirko A. P., Lugovaya T. S. Proc. XII-th Russian Conference on Mathematical Methods of Pattern Recognition, Moscow, MAKS Press, 2005, pp. 387-390. See also Biometric Identification System Based on Electrocardiogram Data by Y. Gahi, et al University of Ontario Institute of Technology, 2000 Simcoe Street North, Oshawa, Ontario, Canada. L1 H 7K4, 2008. For a systematic review and discussion of the current associated methods and the techniques that have been applied to the use of the electrocardiogram for biometric recognition see ECG Biometric Recognition: A Comparative Analysis by Odinaka, I and Preston M. Green in Information Forensics and Security, IEEE Transactions on (Volume: 7, Issue: 6) Biometrics Compendium, IEEE, Pgs. 1812-1824, 2012.

Although traditional ECGs have been through the chest of the user other application sites are known. For example, a finger based ECG has been disclosed and implemented, see Unveiling the Biometric Potential of Finger-Based ECG Signals by André Lourengo, Hugo Silva, and Ana Fred, Computational Intelligence and Neuroscience Volume 2011 (2011), Article ID 720971. The present invention prefers to utilize a wrist based ECG acquisition unit 30 as described below. A suitable ECG device is the biometric ECG bracelet manufactured by Bionym. The wrist worn ECG 30 is the preferred biometric identification technology because it is passive and monitors effectively continuously. It is passive as it does not require the user to take a scanning step like placing a finger or hand or face within a scanning perimeter, the user merely needs to put on the bracelet 30 (or other implementing device). The unit 30 is continuous as it can regularly perform an ECG at defined intervals (e.g. every 10 seconds) in an automated fashion.

The alternative biometric user identification technologies discussed above could be implemented into the system with the addition of an associated scanner (which scanners are, outside of DNA, already commercially available), however the alternative biometric user identification technologies will generally require an active authentication step by the user (swiping the finger, allowing a retinal scan, iris scan, hand scan or facial scan, speaking for a voice sample) and can limit the automatic authentication further than is available with the continuous passive monitoring of the wrist worn ECG 30.

As a broad overview, one embodiment of the present invention provides a system 10 for authenticating a geo-location of an individual 12 via a communication network 14 comprising a) a smartphone 20 having a GPS receiving unit, generally 28, associated with a communications network 14, wherein the system 10 is configured to obtain via the communications network 14 the geo-location of the smartphone 20 utilizing the GPS receiving unit 28; and b) a biometric user identification technology in the form of ECG bracelet 30 worn by the individual configured to obtain biometric characteristics that are unique to each human, wherein the system 10 is configured to identify, generally at 32, the individual 12 with the biometric user identification technology of ECG bracelet 30 and to verify the biometric user identification technology of ECG bracelet 30 is within a preset proximity, generally at 34, to the smartphone 20 to authenticate the individual's geo-location, generally at 36.

A broad overview of the method of the present invention is that the invention provides a method for authenticating the geo-location of an individual 12 via a communication network 14 comprising the steps of: a) providing an individual 12 with a smartphone 20 having a GPS receiving unit (generally 28) associated with a communications network 14; b) providing the individual 12 with a biometric user identification technology, such as ECG bracelet 30; c) obtaining via the communications network 14 the geo-location of the smartphone 20 utilizing the GPS receiving unit 28; d) identifying at 32 the individual 12 with the biometric user identification technology formed by ECG bracelet 30 by obtaining biometric characteristics that are unique to each human; and e) verifying at 34 the biometric user identification technology of ECG bracelet 30 is within a preset proximity to the smartphone 12 to authenticate the individual's geo-location at 36.

Authenticating an individual's geo-location via a communication network 14 of one aspect of the invention may further include recording, possibly at a remote service provider 42, the individual's authenticated geo-locations for at least a period of time, wherein during recording of the individual's authenticated geo-locations, the method may include recording any periods when the individual's geo-location cannot be authenticated. Periods when the individual's geo-location cannot be authenticated include when the biometric characteristics obtained by the biometric user identification technology fail to identify the individual and when the biometric user identification technology is not within a preset proximity to the smartphone 20.

Authenticating an individual's geo-location via a communication network 14 of one aspect of the invention provides wherein system 10 includes incorporating user defined restricted areas for the individual. The restricted areas could be areas in which the individual must remain and operate (e.g., authorized work zones, house arrest limitations, school boundaries), or it could be areas that the individual is prevented from entering (e.g., restricted/high security areas, restraining order limitations) or both. The system may include sending a warning message to the individual when the individual is approaching a boundary of the user defined restricted area. As noted above, "approaching a boundary" is broadly defined in this application as it is intended to encompass both coming close to a restricted area or leaving a defined work area. Further it should be understood that the user defined areas may vary by time and/or by individual.

Authenticating an individual's geo-location via a communication network 14 of one aspect of the invention may provide wherein a single user, such as a service provider 42 is authenticating multiple individual's geo-locations. Authenticating an individual's geo-location via a communication network 14 of one aspect of the invention may further include a system 10 which integrates the authenticated individual's geo-location with location based social networks data (e.g., FACEBOOK®, FOURSQUARE®, etc) as proof-of-presence of the individual in the location based social network data.

Authenticating an individual's geo-location via a communication network 14 of one aspect of the invention may further include cross-checking the authenticated individual's geo-location with location based check-in data from location based platforms to further validate as proof-of-presence the geo-location data of the individual's presence at a certain location. The system 10 may further include identifying any anomalous results between the authenticated individual's geo-location and the location based check-in data from location based platforms.

The system 10 for authenticating an individual's geo-location via a communication network 14 of one aspect of the present invention may further include marking recordings, such as pictures, videos or audio recordings, taken with the individual smartphone 20 with the geo-location where the image was taken, the time the was taken, and the authenticated geo-location data of the individual 12 when and where the recording (image or the like) was taken. The system 10 will allow for authentication of any image, video, audio recording and/or sensor reading recorded by the smartphone 20 to verify the location and individual 12 making the record via the smartphone 20.

Authenticating an individual's geo-location via a communication network 14 of one aspect of the invention may further include limiting access to at least some of the smartphone 20 applications, e.g. banking applications, to the individual 12 as verified by the biometric user identification technology of the ECG bracelet 30. The system 10 may further provide wherein the limiting access to at least some of the smartphone applications to the individual 12 as verified by the biometric user identification technology includes limited access to at least some of the smartphone applications when the individual 12 and the smartphone 20 are within pre-defined geo-locations. For example, a bank ATM may utilize and interact with the smartphone 20 of the individual 12 to quickly and safely access a proper individual's account and the bank ATM may further verify the identity of the individual 12 both with the biometric technology of the ECG bracelet 30 and by the presence of the phone 20 and individual 12 at the pre-designated ATM geo-location, thereby passively providing a high level of security.

Authenticating an individual's geo-location via a communication network 14 with the system 10 provides wherein the individual owner of the smartphone interacts with Internet-Of-Things devices 61. All of these aspects will be described further below.

The system 10 and method may be described as relating to a comprehensive web3.0 software utility, an Internet of Things (IoT) geo-locations software management utility via a communication network 14 and includes a ECG wristband 30 (with Bluetooth transmitter) that an individual 12 wears on his/her wrist, a secured user-to-smartphone identification access management system, a cellular network 14, a storage network, a database and an online software as a service application provider 42. More simply, the present invention deals with securing that both the individual 12 and the smartphone 20 are always present at the same geo-location at the time the geo-location of the smartphone 20 via (GPS) position is captured and logged-in by the geo-location software into the database via a communications network 14 as schematically illustrated in FIG. 1.

In order to determine that both the individual 12 (sometimes who may be the owner of the smartphone 20) and the smartphone 20 are, were both present at the same geo-location position, the individual must wear a wrist band 30 that is equipped with a wireless data transmitter so that the geo-location software management utility can manage the individual's presence with their smartphone 20. Further if the wristband 30 is worn by an individual 12 at all times the geo-location software management utility 42 can capture and store data via a communications network 14 of individual's traveled path history. The ECG wristband 30 is equipped with heart signal transmitter and obtains unique cardiac rhythm signals for each individual 12 which can be used to verify at 32 the identity of the individual 12 according to pre-existing ECG signals associated with the individual. The particular algorithms used for matching ECG signals are known to those in the biometric art. In addition to verifying the geo-position of the individual 12 the ECG wristband 30 of system 10 may be used to give the individual 12 a wireless, non-contact auto access to their smartphone 20 or selected apps thereon. In other words the wearing of the wristband 30 may be required for the individual 12 to access and use select apps of the phone 20.

Practically the present invention includes a geo-location software application the individual 12 (or distinct system 10 user such as employer, oversight official or the like) needs to download and install in the smartphone 20. Once the geo-location software application is installed in the individual's smartphone 30, a listening engine 44 process is launched and runs as a hidden process in the smartphone 20 background. At the same time, the geo-location software that is now running as an application on the individual's phone 20 alerts the geo-software networks 42 letting them know that a new individual 12 will be using the geo-location software management services and to create a database to store this new and unique individual's data.

Now that geo-location software management utility is installed in the individual's smartphone 20, and the listening engine 44 is running as a process in the background the auto-detect process to secure that both the individual 12 and their smartphone 20 are both present at the same location for proof-of-presence can start.

As noted above, the system 10 integrates an ECG wristband 30 to be worn by an individual 12 at all times. The wristband 30 is equipped with heart rhythm signal wireless transmitter 46 and generates unique cardiac rhythms for each individual. Like a fingerprint (and other identifying biomarkers), each individual's ECG heart rhythms are unique to each individual 12. The present invention system 10 uses the individual cardiac rhythms of the ECG from wristband 30 to authenticate the individual 12's identity, allowing individuals 12 to wirelessly authenticate and gain access to select apps on their smartphone 20. This log-in state data is stored in a register in the smartphone 20 memory and is to be used by the software management listening engine 44.

The geo-software management listening engine 44 runs as a process in the smartphone 20 background and is always looking at detecting and validating two conditional states: 1] The log-in state, that the individual 12 has securely gained access, and is now logged-in to their smartphone 20. 2] That the distance or the tolerated threshold set to be maintained at all times between the worn wristband 30 by the individual 12 and their smartphone 20 is maintained and is valid. These two states validation are essential and must be valid in order for the geo-location software management to start or stop capturing and storing the individual's authenticated geo-location position.

The listening engine 44 continuously reads the logged-in state register data that is previously stored in the smartphone 20 memory when the individual 12 has gained access to their smartphone 20 (because the band 30 has verified the identity of the individual with the biometric). If the log-in state is true, then the listening engine 44 only needs verify if the distance between the wristband 30 and the smartphone 20 is within the assigned threshold. If the distance measured between the wristband 30 and the smartphone 20 is with-in the threshold, then the present system 10 authenticates that the individual 12 and the smartphone 20 are both present at the same geo-location position.

The present invention system 10 is a geo-location software management utility 42 which can capture the individual's geo-location position and stores the data in a database online (at 42) which can be accessed online at a later time for viewing and printing. This geo-location software application must be downloaded and installed by the individuals 12 in their smartphone 20. When the geo-location software application is installed in the individual's smartphone 20, the geo-location software application alerts the geo-location software online service network 42 via a communications network 14 letting them know that an individual 12 has installed the software application and wants the geo-location services to begin capturing and storing their geo-location position. The geo-location software management utility contains a software sub-routine process called the listening engine 44 and runs automatically and continually without the intervention or need of input of the individual 12. This listening engine 44 runs as a process in the background of the smartphone 20 and monitors if the user/individual 12 is still logged-in and has access to their smartphone 20, which operation is schematically shown in the figures.

The system 10 and associated method solves one issue that can be called a proof-of-presence of the individual at a certain location at a certain time. The geo-location software as a service application provider 42 not only captures and stores data online via a communications network 14 of the location of the individual's smartphone 12 using GPS but also secures that the individual 12 who is the owner/registered user of the cell phone 20 is also present when the smartphone's geo-position was captured and stored. In this invention, the data captured and stored provides a verified history of the locations of the individual's traveled path. Individuals (or the system 10 user which may be an employer or the like) can access, on demand, through their smartphones 20 their geo-locations data history and be able to view or print a hard copy of their geo-location's whereabouts for any specific day and time in the past.

Figure 7:
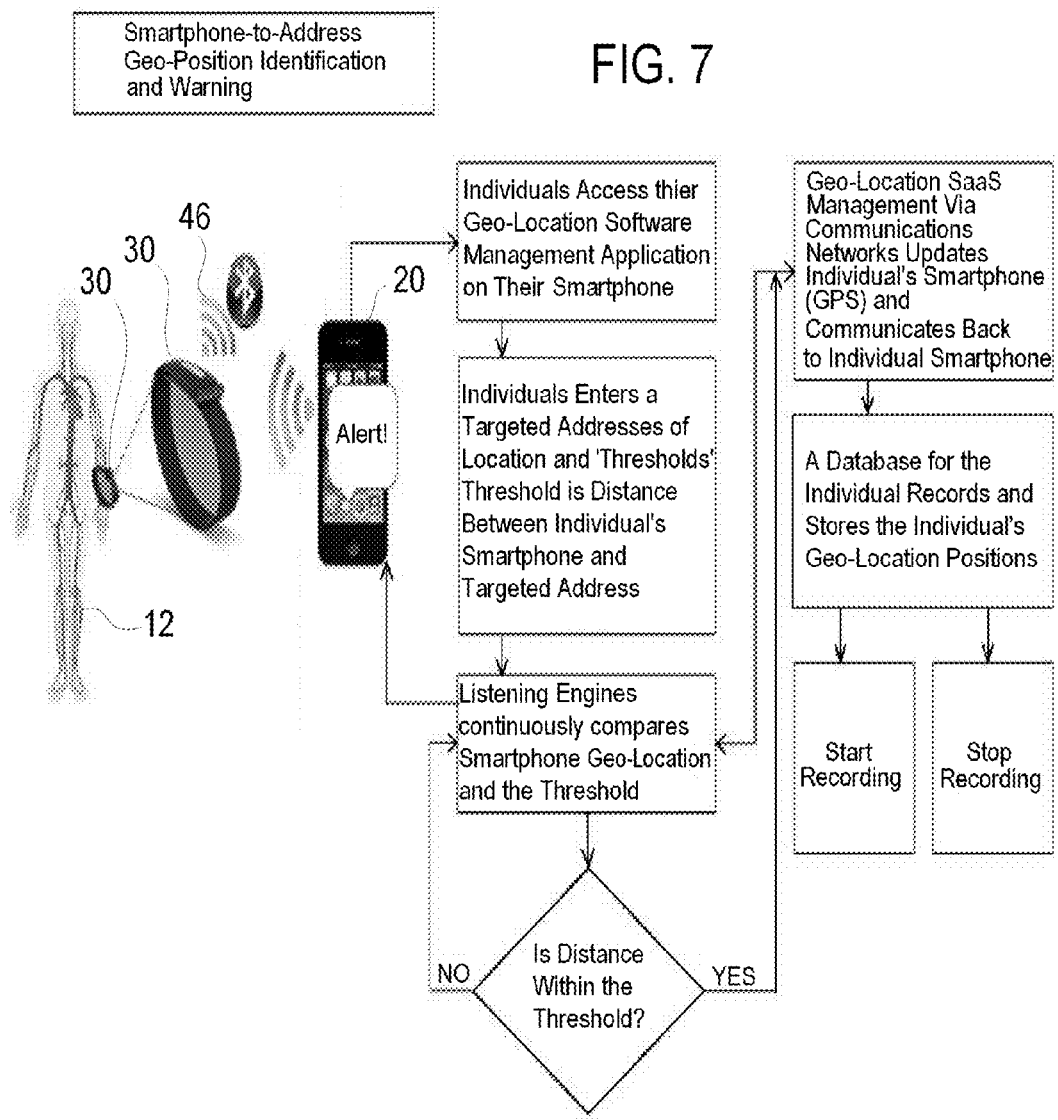
FIG. 7 is a schematic diagram of a process for communication of Smartphone to address geo-position identification and warning in accordance with one aspect of the system of FIG. 1.

The present system 10 and associated method allows individuals 12 to access the geo-location software utility 28 that is running on their smartphones 20 to turn on the smartphone-to-address distance warning. Here the individual 12 (or system 10 user for given individuals 12) can setup a comfortable distance between their smartphone geo-location position and an address they want the geo-location utility to alert them they are approaching when on a traveled path. Individuals 12 can select an address, using multi-touch over a map on their smartphone 20, or by keying the address in the geo-location database, and set a range or distance threshold, as shown in FIG. 7. As the individual 12 is traveling, the geo-location software management continually measures the distance between the address stored in the database and the individual's smartphone (GPS) location. A real-time warning is issued, when the smartphone-to-address has entered the threshold distance. Individuals 12 can target multiple address locations, and set threshold distances to all using the geo-location software management service.

Figure 8:
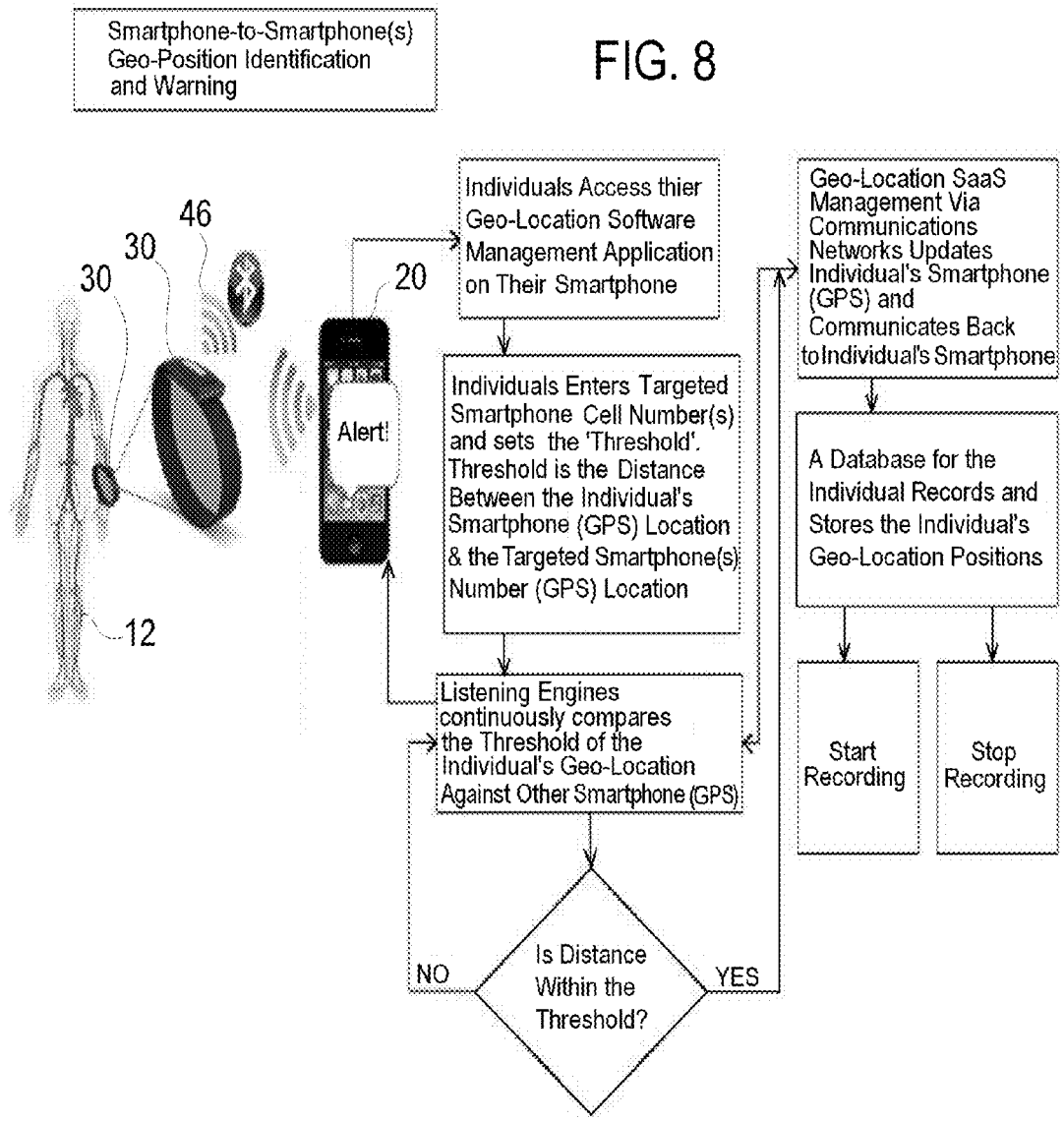
FIG. 8 is a schematic diagram of a process for communication of Smartphone to smartphone(s) geo-position identification and warning in accordance with one aspect of the system of FIG. 1.

Furthermore, the present system 10 allows individuals to access the geo-location software service that is running on their smartphones 20 and activate smartphone-to-smartphone(s) threshold alert options as shown in FIG. 8. Individuals 12 can select other smartphones numbers as targets they wish to maintain a certain geo-position distance away from. As the individual 12 is traveling, the geo-location software management continually measures the distance between the smartphone's (GPS) target number(s) stored in the database and the individual's own smartphone (GPS) geo-location, assuming the target phone has GPS and is accessible to the system 10. A real-time warning is issued, when the pre-set target threshold is violated. Individuals can target multiple smartphones, and set thresholds to all using the geo-location software management service.

Figure 9:
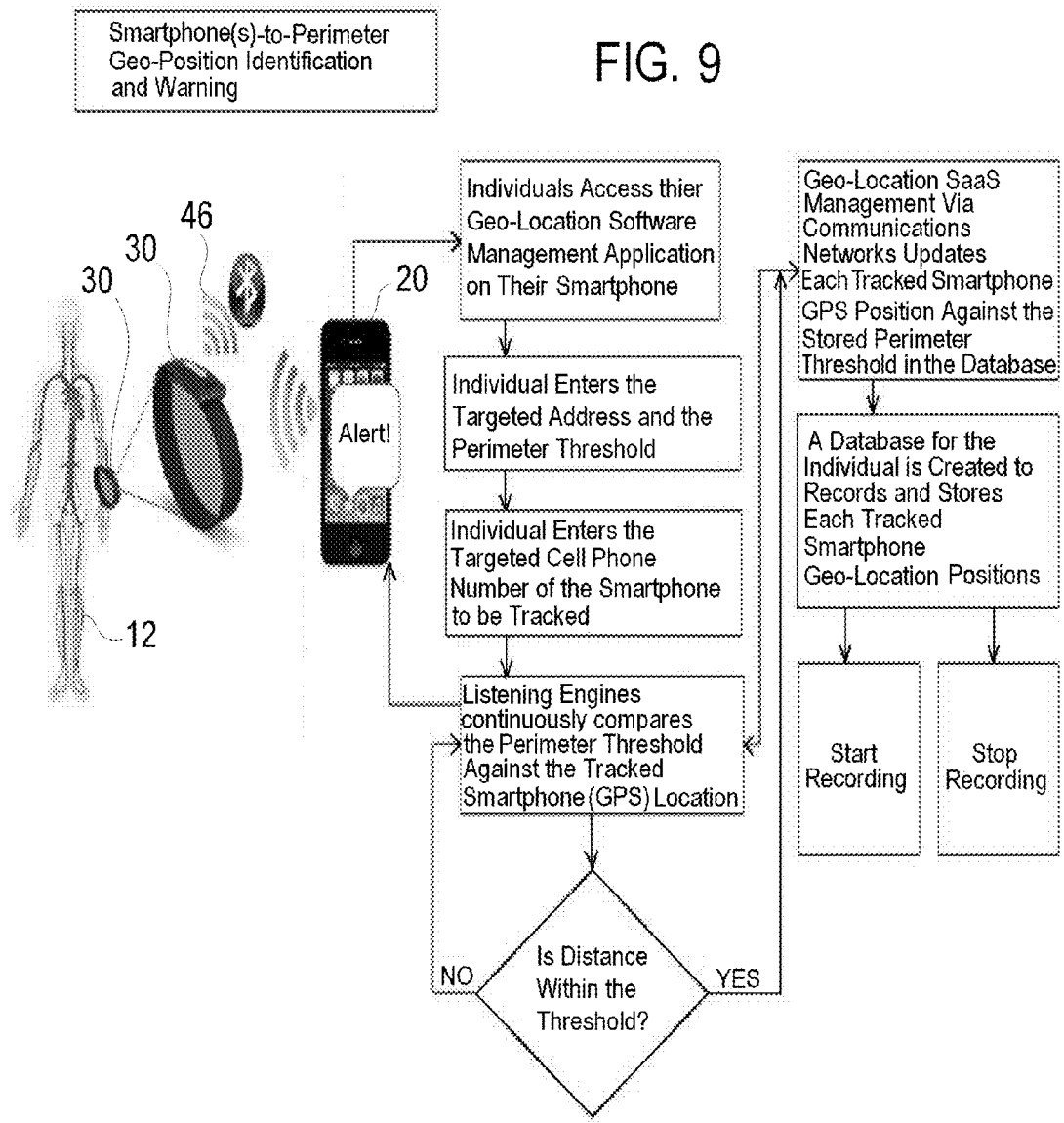
FIG. 9 is a schematic diagram of a process for communication of Smartphone to perimeter geo-position identification and warning in accordance with one aspect of the system of FIG. 1.

Additionally, the present invention system 10, as shown in FIG. 9, deals with smartphones-to-perimeter tracking. The process deals with the tracking of several individuals 12 using their smartphone cell numbers (GPS) position.

For the sake of clarification the following is a representative example to illustrate the utility of the system 10, in this case: Parents who would like to make sure that their kids do not leave the perimeter of a certain address, namely a school's address. The parents using the geo-location software management that is installed on their child's smartphone 20 (or the smartphone 20 that the child uses as the child 12 does not own the smartphone 20 in this case) can select the address of the school and set a threshold, which is a specific geo-location perimeter and radius. The parents also key in their kids' smartphone numbers to be tracked in the geo-location software management database located at 42. With the Child 12 wearing the bracelet 30, the moment the threshold of the tracked smartphones 20 exceeds the stored threshold, a warning is send to the parent's smartphone that is running the geo-location software management service. A warning can also be sent to the parents if the phone 20 is distanced from the bracelet 30 beyond a threshold distance (which has both phone theft or loss prevention aspects and prevents the child from thwarting the desired tracking) or if the bracelet is no longer identifying the unique ECG's of the child 12 (which feature will yield both medical safety aspects and compliance aspects for the parent).

Figure 10:
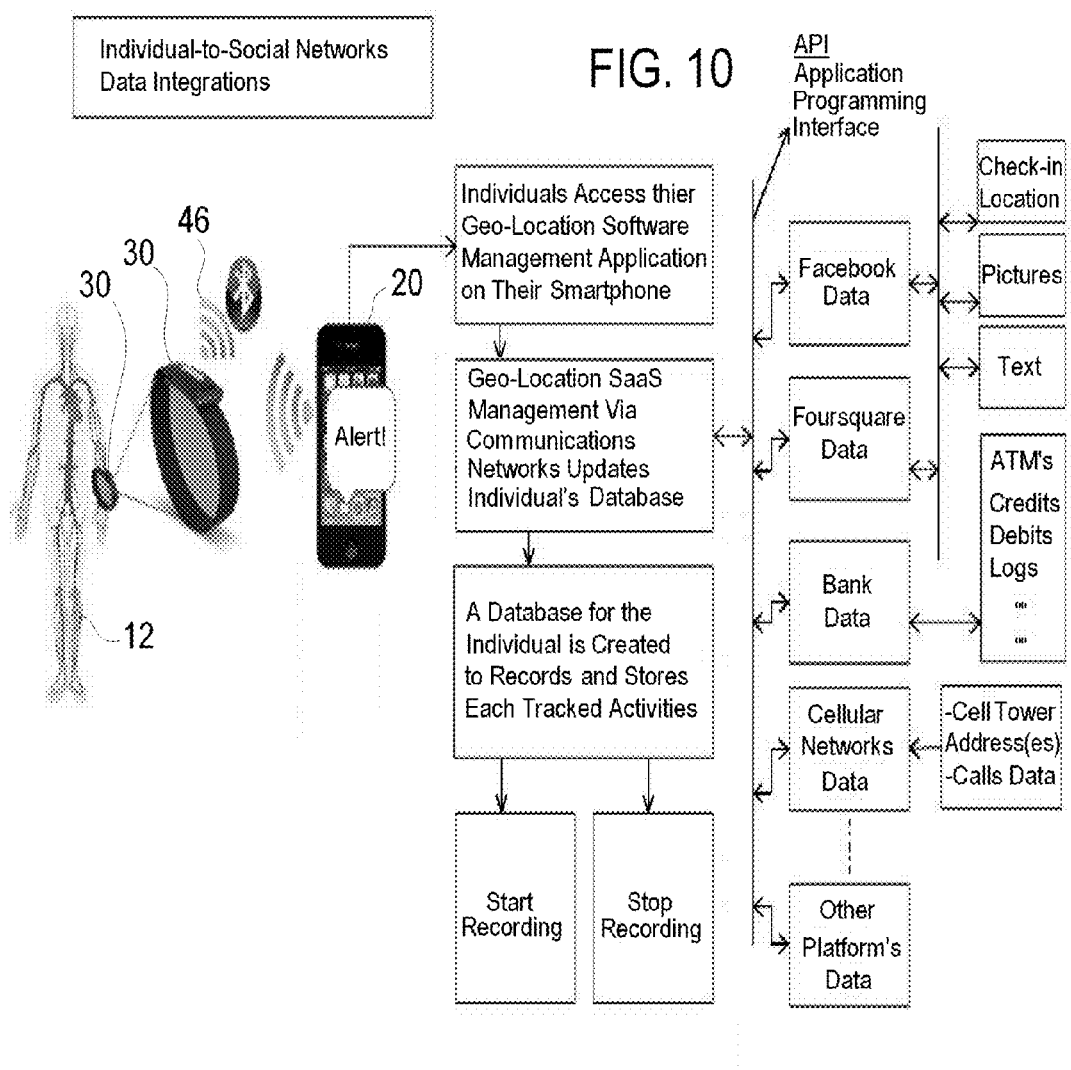
FIG. 10 is a schematic diagram of a process for Individual to social networks data integrations in accordance with one aspect of the system of FIG. 1.

The present system 10 also allows individuals 12 to access the geo-location software service that is running on their smartphones and activate the application programming interface (API) to automatically allowing other social network(s) location based check-ins software platforms data to be added and integrated to the individual's geo-location software management database, as generally shown in FIG. 10. Other platforms' data may be such as FACEBOOK® location base check-in data, FOURSQUARE® location base check-in data. The present system 10's API integration of social networks location base to the geo-location software management service is not limited to just FACEBOOK® and FOURSQUARE® data integration. The term check-in data in this present invention is not limited to only the time and the location base check-ins but also includes the pictures posted at the time of the check-ins as well as the embedded date, time stamp and the geo-location associated with each picture as well as the text message associated with the check-in message data.

The present system 10 allows individuals 12 to access the geo-location software service 42 that is running on their smartphones 20 and activate the application programming interface (API), see FIG. 10, to automatically allow the individual's bank transaction(s) data to be added and integrated to the individual's geo-location software management database. The system 10 allows individuals 12 to access the geo-location software service 42 that is running on their smartphones 20 and activate the application programming interface (API), again shown in FIG. 10, to automatically allow the individual's wireless communication data to be added and integrated to the individual's geo-location software management database. Wireless communication data is not limited to the individual's cellphone data, but also includes the location region and or address of the cellphone towers where the calls and data communications came from.

Figure 11:
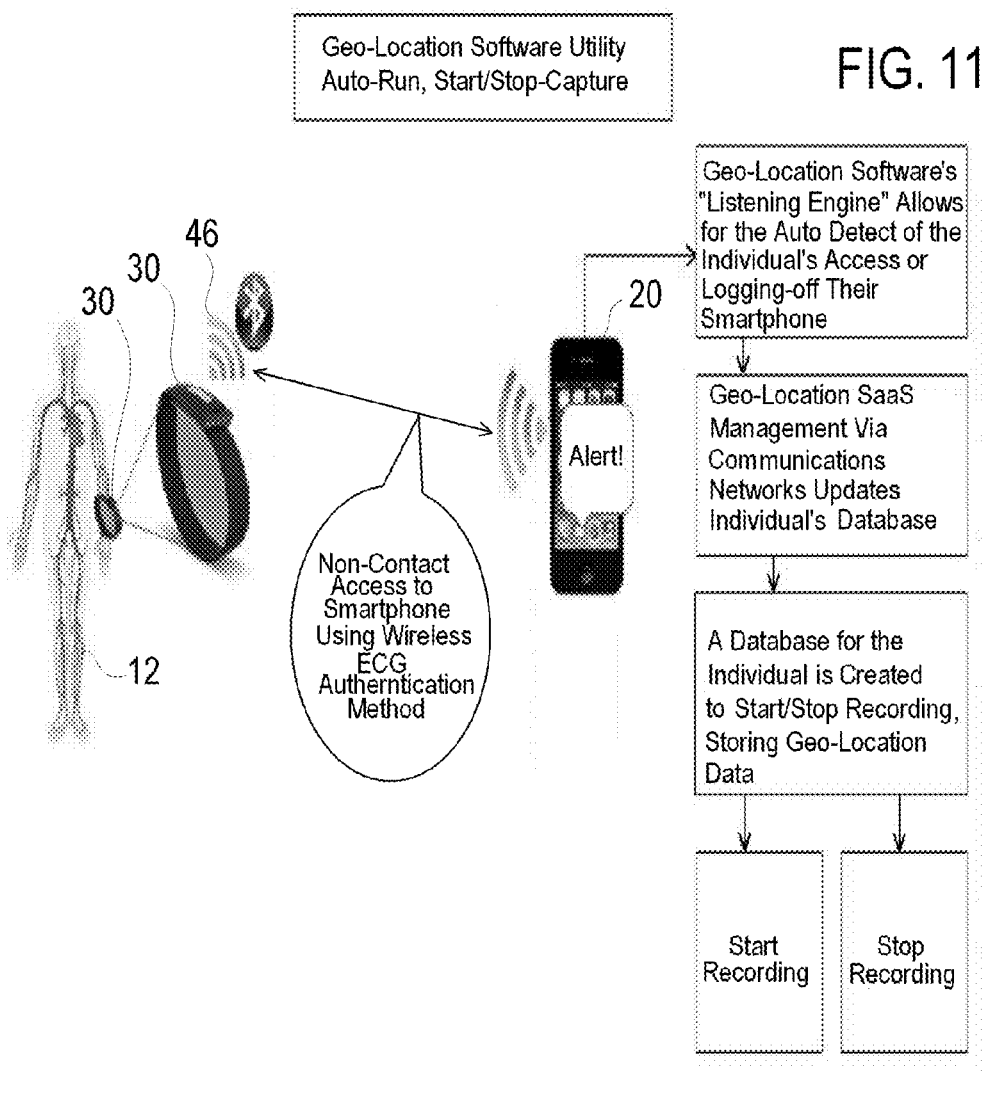
FIG. 11 is a schematic diagram of aspects of the geo-location software utility in accordance with one aspect of the system of FIG. 1.
Figure 12:
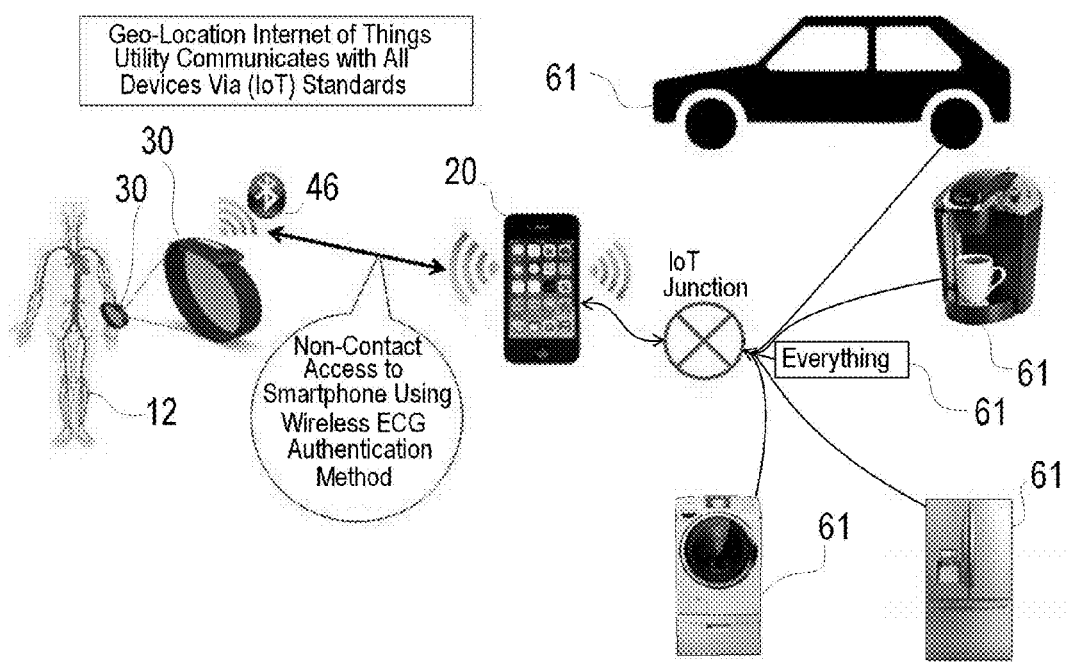
FIG. 12 is a schematic diagram of aspects of a geo-location internet of things utility in accordance with one aspect of the system of FIG. 1.

The present invention system 10 allows individuals 12 with the use of a wrist band 30's heart signal ECG based identification signature method to wirelessly and without the individual touching their smartphone to automatically authenticate and access their smartphone 20 allowing at that specific access instance for the geo-location software management service to automatically start capturing and recording the individual's smartphone geo-location (GPS) position data, see generally FIG. 11. Furthermore the present system 10 allows individuals 12 with the use of the wrist band 30 to enable the Internet-of-Things (IoT) devices 61 to identify the individual 12 who has authenticated to the IoT device(s) 61, shown in FIG. 12. The geo-location software utility 42 will register and retrieve data from the associated device 61: Data which is not limited to the Internet protocol (IP) of the devices and may be associated with address location, time of interaction(s) with the device, etc. Examples of such devices 61 can be a car, washing machines, refrigerator, TV, coffee maker, smart bulb. As a brief representative example, an apartment building may, as a safety concern, only allow interaction and operation with a washing machine or dryer with an authenticated user 12 when the user is located close to the device (e.g. in the building, on the same floor, etc), and the system 10 easily accommodates this application for the building manager. Note further billing for use of the interaction with the device 61 by the authenticating user can be handled/verified with the system 10 replacing the complex coin operated and related systems now in place. As a further example, parental control of TVs, Refrigerators and other smart devices 61 is easily implemented with the system 10 and the system 10 allows the device 61 to submit relevant information to the system 10 regarding the particulars of the interaction that can be relevant for the parent. The uses of smart devices 61 are legion and the present system 10 adds a simple cost effective individual and geographic verification aspect to the implementation of such devices 61, and further the information obtained from such devices 61 associated with authorized interaction and control of such devices 61 further enhances the applications of the system 10.

The present system 10 and associated method can be described or summarized as a comprehensive web3.0 software utility, an Internet of Things (IoT) geo-locations software management utility 42 to manage the individual 12's geo-location of their traveled path via biometric user identification coupled with capturing, recording and storing their smartphone 20's GPS location via a communications network 14. The individual 12 can access online via their smartphone 12 (or a desktop computer) the geo-location software utility to view and print the history of their traveled path. The present invention integrates the use of a biometric ECG wristband 30 that integrates a wireless heart rhythm (ECG) identification signature transmitter and allows for a wireless authentication of the individual 12 to access their smartphone 20. The present system 10 includes a process which starts automatically at the instance it detects that the individual 12 has gained access to their smartphone 20 and begins capturing and recording the individual's authenticated smartphone geo-location (GPS) position data. The individual's captured data includes the geo-location position of their smartphone's (GPS) position and the time it was captured. More particularly, the present invention deals with securing that both the individual 12 and the smartphone 20 are always present at the same geo-location at the time the geo-location of the smartphone via (GPS) position is captured and logged-in into the software as a service 42 database via a communications network 14. The present system 10 secures that the individual 12, and possible owner of the smartphone 20, is the unique user/owner of the smartphone 20 with the use the individual's cardiac rhythm ECG like a fingerprint signature to authenticate and gain access to the smartphone 20.

The above description is in the abstract but some representative examples may further highlight the applications for the system 10.

Fleet and Crew GPS Tracking

One implementation of the system 10 and associated method of the present invention is for what is known as GPS Fleet Tracking in which a company which operates a number of vehicles and drivers (e.g., for deliveries/pickups) desires to utilize GPS trackers for vehicle and driver management. Implementing existing GPS fleet tracking is known to reduce fuel costs by tracking driver behaviors that can drive fuel bills up and single out fuel charges by vehicle and eliminate unauthorized fuel-ups; and is known to potentially lower insurance premiums by allowing the entity to proactively manage and encourage driver safety; and is known to yield automatic governmental compliance with digital logbooks because the entity will obtain real time status information (e.g. HOS status) in the office and send proactive alerts to drivers to help prevent violations. As examples of conventional GPS Fleet Tracking systems see Fleetmatics Development Limited's FLEETMATICS™ system and Verizon's NETWORKFLEET™ system.

The system 10 of the present invention described above is easily operable as a cost effective GPS Fleet Tracking system and the current system 10 yields the additional benefits (above conventional GPS Fleet Tracking) of authenticating and tracking each individual 12 driver and/or crew member via their own smartphone 20. This system 10 also allows for tracking of a single driver 12 with multiple vehicles and individual crew members 12 even in interchanging crews (e.g. a crew member begins a shift with one vehicle and switches to a second or third vehicle throughout the shift). The vehicles may themselves, in some cases, be devices 61 that interact with the system 10 to give further detailed information regarding each individuals use of the vehicle (in addition to the identity and position data of the phone 20). However, one significant use of the system 10 is for inexpensive fleet tracking without retrofitting an existing vehicle fleet.

Legal System Individual Location Verification

1. Restraining Orders

Several distinct but related implementations of the system 10 and associated method of the present invention are presented in the legal system which has reason to verify and track the location of select individuals 12. One implementation is often found in the area of restraining orders, also known as protective orders, that are common in family law. Alleged violations of restraining orders can clog the court process and cost the parties substantial sums in excess attorney fees as proof of violation or non-violation is difficult. The system 10 of the present invention can easily provide a provable court record of an individual 12 location when associated with their cell phone 20. Restrictions on coming close to another party's home, or place of business is easily implemented. Further, the system 10 allows the restriction and warnings to be expanded to a zone around select third party cell phones to be added. Warnings can be sent to the individual and the court and the other parties in the case. Further periods when the user does not have a verified location can be noted by the system. Voluntary adoption of the system 10 by users will likely be driven by the reduced legal fees.

2. Bail

The system 10 can be used by a court to inexpensively and effectively enforce bail restrictions on an individual 12 in criminal matters and thus allow far greater number of individuals qualify for bail and greatly reduce the cost of housing suspects awaiting trial. Geographic restrictions can be easily added for any individual 12 (e.g. prohibitions on leaving the state, prohibitions on going to certain locations). Restrictions on coming into contact with certain parties (e.g., witnesses, alleged victims) can easily be added via telephone numbers of the third parties and associated thresholds (with such numbers being withheld from the individual 12). Compliance with the system 10 is likely another condition of bail (e.g. a individual is advised "you must have your phone on at all times and also have the wristband 30 on so the system can track you"). Again voluntary adoption of the system 10 by individuals 12 will likely be driven by the reduced bail fees associated with adopting and complying with the system 10.

3. Parole/House Arrest Enforcement

The system 10 can be used by a court to inexpensively and effectively enforce parole and/or house arrest restrictions on an individual 12 in criminal matters and thus allow far greater number of individuals qualify for an automated supervised parole or house arrest and greatly reduce the costs to the criminal justice system. The system 10 is easily modified for individual parolees and or house arrest individuals. It can verify that they are at work during scheduled work days and at home when scheduled to be at home with alerts. Geographic restrictions and third party restrictions can also be added and monitored automatically. Warnings and or violations of the conditions or compliance can be sent to the individual and the court (e.g., the parole officer). The system 10 is cost effective and efficient.

Geographic Validation of Smartphone Captured Data

The system 10 for authenticating an individual 12's geo-location via a communication network 12 may include marking recordings, such as pictures, videos or audio recordings, taken with the individual's smartphone 20 with the geo-location where the image was taken, the time the was taken, and the authenticated geo-location data of the individual 12 when and where the image was taken. The system 10 will allow for authentication of any image, video, audio recording and/or sensor reading recorded by the smartphone to verify the location and individual making the record via the smartphone.

1. Inspection-Inspector Authentication

Inspectors, such as building inspectors, will often obtain images or video (or even sensor readings) of the inspection to supplement the inspection. Sometimes it is questioned whether an image or video was taken at a given time, and/or taken by a given inspector at that time. The system 10 verifies the authorized individual 12 was with the phone 20 when the subject recording was taken and the data is stamped (also called an electronic watermark) on the recording. The system 10 thus validates the inspection.

2. Photographer—Copyright Owner

A copyright in an image or video will vest when the image is fixed in tangible form (when the image is taken) and the ownership will vest in the author (e.g. the photographer), outside of a work made for hire. A timely image of a current event can be a valuable commodity for the author (photographer) and purchasers sometimes need some assurance that the person proffering authorship and ownership of the work in question actually holds title thereto. The system 10 verifies the authorized individual 12 was with the phone 20 when the subject recording was taken and the image/video is stamped (also called an electronic watermark) on the recording, thus the system 10 corroborates ownership of the work in question.

3. Research—Researcher Authentication

Smartphones 20 can take almost an unlimited type of data as any number of sensors have been designed to couple to a portable phone 20. The system 10 allows a simple inexpensive method for researchers to validate the time, place and person obtaining the data by electronic watermarking the recordings with the relevant information. Questions regarding timing or validity of the data (or who obtained such data), which can needlessly question the veracity of a test, are simply removed with implementation of the system 10. Arguably the system 10 can be part of a researcher's best practices.

Geographic Limits for App Access

As described above the system 10 can be used to give the user access to operation of the cell phone 20 completely. Of course the system may be used to restrict access to only a portion of the cell phone apps (i.e. an third party may use the phone 20 but some apps will be locked out because there is no verification of identity. However the present system 10 can go further than merely limiting access to certain applications, the system 10 can tie the access the further requirement of the phone 20 and the verified user 12 being in a designated location.

1. Bank ATM

One application for geographic limits for application access is interaction with bank ATM. The system will verify the identity of the individual 12 via the biometric ECG band to add an initial layer of security, but will also verify that the individual and the phone are in close proximity to the designated ATM to add a further layer of security difficult to defeat.

2. Phone Applications that an Individual can Only Access at a Designated Location It may be desirable to allow individuals to have access to and interact with on-site systems, such as hospital employees accessing patient records at a hospital, through the individuals phone, and to automatically prevent such access when the individuals leave a designated area (e.g. when the individual hospital employee leaves the hospital). The system 10 allows this functionality to be easily implemented and improve employee's ability to cost effectively interact with secure records in a desired and secure manner.

3. Devices that an Individual can Only Access at a Designated Location

It may be desirable to allow authenticated individuals to have access to and interact with on-site devices 61, such as a worksite washing machine, through the individuals phone 12, and to automatically prevent such access when the individual leaves a designated area (e.g. when the individual employee leaves the workplace). The system 10 allows this functionality to be easily implemented and improve employee's ability to cost effectively interact with an onsite device 61 in a desired and controlled manner. The device 61 can communicate information to the system 10 relevant to the individual's interaction with the device 61 sufficient for the efficient control of the resource/device 61 (e.g. finding out that the marketing department is using the coffee maker or copier or 3d printer or similar device 61 more than the engineering department and accounting department and human recourses combined and it warrants getting them their own device 61—and accounting for the device 61 accordingly for more efficient business management). A cooperative Laundromat (such as at an apartment building) using washing machine and dryers as devices 61, or a library using onsite resource devices 61 (copiers, printers, etc) represent other obvious applications of the system 10 in this context.

Parental Supervision

Most of the above applications can have separate utility for parents supervising their children and their children's use of phones.

It is apparent that many variations to the present invention may be made without departing from the spirit and scope of the invention. The present invention is defined by the appended claims and equivalents thereto.

What is claimed is:

1. A method for authenticating an individual's mobile geo-location via a communication network comprising the steps of:
   a) providing an individual with a smartphone having a GPS receiving unit associated with a communications network;
   b) providing the individual with a biometric user identification technology coupled to the smartphone;
   c) obtaining via the communications network the geo-location of the smartphone utilizing the GPS receiving unit;
   d) identifying the user with the biometric user identification technology by obtaining biometric characteristics that are unique to each human; and
   e) verifying via the communications network the biometric user identification technology is within a preset proximity to the smartphone to authenticate the individual's mobile geo-location anywhere within a geographic scope of the communications network of the smartphone.

2. The method for authenticating an individual's geo-location via a communication network of claim 1, wherein the biometric user identification technology utilizes the individual's electrocardiogram as a biometric characteristic that is unique to each human.

3. The method for authenticating an individual's geo-location via a communication network of claim 1, wherein the biometric user identification technology utilizes a wristband worn by the individual and wherein the wristband is wirelessly coupled to the smartphone.

4. The method for authenticating an individual's geo-location via a communication network of claim 1, further including the step of recording the individual's authenticated geo-locations for at least a period of time.

5. The method for authenticating an individual's geo-location via a communication network of claim 4, wherein during the step of recording the individual's authenticated geo-locations for at least a period of time, the method includes the steps of recording any periods when the individual's geo-location cannot be authenticated including when the biometric characteristics obtained by the biometric user identification technology fails to identify the user and recording any periods when the biometric user identification technology is not within a preset proximity to the smartphone.

6. The method for authenticating an individual's geo-location via a communication network of claim 1, wherein the method includes the step of incorporating a user defined restricted areas for the individual.

7. The method for authenticating an individual's geo-location via a communication network of claim 6, wherein the method includes the step of sending a warning message to the individual when the individual is approaching a boundary of the user defined restricted area.

8. The method for authenticating an individual's geo-location via a communication network of claim 1 wherein a single user is authenticating multiple individual's geo-locations.

9. The method for authenticating an individual's geo-location via a communication network of claim 8, wherein the method includes the step of incorporating user defined restricted areas for each of the individuals.

10. The method for authenticating an individual's geo-location via a communication network of claim 9, wherein the user defined restricted areas for each of the individuals may vary by time and or by individual.

11. The method for authenticating an individual's geo-location via a communication network of claim 10, wherein the method includes the step of sending a warning message to an individual when the individual is approaching a boundary of the user defined restricted area for that individual.

12. The method for authenticating an individual's geo-location via a communication network of claim 1, further including the step of integrating the authenticated individual's geo-location with location based social networks data as proof-of-presence of the individual in the location based social network data.

13. The method for authenticating an individual's geo-location via a communication network of claim 1, further including the step cross-checking the authenticated individual's geo-location with location based check-in data from location based platforms to further validate as proof-of-presence the geo-location data of the individual's presence at a certain location.

14. The method for authenticating an individual's geo-location via a communication network of claim 13, further including the step of identifying any anomalous results between the authenticated individual's geo-location and the location based check-in data from location based platforms.

15. The method for authenticating an individual's geo-location via a communication network of claim 1, further including the step of marking images taken with the individual smartphone with the geo-location where the image was taken, the time the image was taken, the authenticated geo-location data of the individual when and where the image was taken.

16. A method for authenticating an individual's mobile geo-location via a communication network, comprising the steps of:
   a) providing an individual with a smartphone having a GPS receiving unit associated with a communications network;
   b) providing the individual with a biometric user identification technology coupled to the smartphone;
   c) obtaining via the communications network the geo-location of the smartphone utilizing the GPS receiving unit;
   d) identifying the user with the biometric user identification technology by obtaining biometric characteristics that are unique to each human; and
   e) verifying via the communications network the biometric user identification technology is within a preset proximity to the smartphone to authenticate the individual's mobile geo-location anywhere within a geographic scope of the communications network of the smartphone, and further including the step limiting access to at least some of the smartphone applications to the individual as verified by the biometric user identification technology.

17. The method for authenticating an individual's geo-location via a communication network of claim 16, wherein the step of limiting access to at least some of the smartphone applications to the individual as verified by the biometric user identification technology includes limited access to at least some of the smartphone applications when the individual and the smartphone are within pre-defined geo-locations.

18. The method for authenticating an individual's geo-location via a communication network of claim 16, wherein the individual owner of the smartphone interacts with Internet-Of-Things devices.

* * * * *